Patented July 15, 1924.

1,501,107

UNITED STATES PATENT OFFICE.

MINOR F. H. GOUVERNEUR, OF BALTIMORE, MARYLAND, ASSIGNOR TO LOCKE INSULATOR CORPORATION, OF BALTIMORE, MARYLAND, A CORPORATION OF MARYLAND.

METHOD OF CONNECTING INSULATOR PARTS.

No Drawing.   Application filed April 27, 1922.   Serial No. 556,981.

*To all whom it may concern:*

Be it known that I, MINOR F. H. GOUVERNEUR, a citizen of the United States, residing at Baltimore, in the State of Maryland, have invented certain new and useful Improvements in Methods of Connecting Insulator Parts; and I do hereby declare the following to be a full, clear, and exact description of the invention, such as will enable others skilled in the art to which it appertains to make and use the same.

The invention relates to high tension insulators and more particularly to that type of insulator in which a plurality of insulating units or an insulating unit and a plurality of metallic units are connected together preferably by means of a hydraulic cementitious compound.

The principal object of my invention, generally considered, is to provide a method of impregnating the hydraulic cementitious compound which is interposed between the parts of an insulator with a solution or substance which will prevent the absorption of moisture by the said compound.

Another object of the invention is to provide a method for impregnating a hydraulic cementitious compound along its surface so as to prevent the absorption of moisture by the said compound.

A still further object of the invention is to provide means for connecting insulating units whereby the hydraulic cementitious compound is rendered impervious to moisture and the subsequent hydration of the same is prevented.

There are other objects of the invention as will hereinafter more fully appear from the detailed description of the preferred method which will now be described.

Before describing the invention in detail it is believed that a better understanding will be obtained by briefly discussing the difficulties now experienced in insulator units when the same are connected by hydraulic cement. It is well known to those skilled in the insulating art that when insulators comprise a plurality of units or a single insulating unit having associated therewith metal members, that these various units or members are almost universally connected together by means of a cementing compound preferably formed from neat Portland cement. Great care is taken in the production of this hydraulic cement but in spite of this precaution the cementing compound after setting gradually absorbs moisture from the atmosphere and this constant absorption of moisture results in a slow but continuous hydration of the cementing compound with the constant increase in bulk or volume of the cement. This increase in bulk or volume of the cementing compound places upon the connected insulating units tremendous crushing strains which often are sufficient to crack the porcelain causing break-down of the insulators and danger to persons by short circuits and like disastrous occurrences.

Various efforts have been made to render the cementing compound so used impervious to moisture by coating the exposed portions of the cement with pitch, rosin, or some coal tar derivative, but these attempts have been, so far as I am aware, unsuccessful in that the surface portions of the cement which are adjacent the adjoining surfaces of the porcelain are not protected and continue to absorb moisture by capillary attraction. It will of course be obvious that the coefficient of expansion of cement is not the same as porcelain or as both porcelain and metal. There is therefore at all times a tendency for the cement to separate from the porcelain or from the metal owing to the difference in the coefficient of expansion of the cement and porcelain and metal and while this separation of the cement is infinitesimal it is, nevertheless, sufficient to permit moisture to be drawn in between the cement and the adjacent surface, resulting in the continual hydration of the cementing compound.

In my process I avoid the difficulties which have been pointed out above, by providing means for impregnating the exposed surface area of cement with a non-volatile compound which renders the entire cementing surface impervious to moisture and thereby prevent this increase in bulk or volume and consequently greatly prolongs the life of the multiple unit insulator. In carrying out my process I preferably coat the porcelain or metal surfaces to be cemented with a substantially non-volatile semi-fluid material such, for example, as is obtained as the result of the destructive distillation of pitch or long leaf pine. This oily substance clings to the coated surfaces to which it is applied with great tenacity and is not volatile except at extremely high temperatures. I then fill the intervening space between the adjacent surfaces with a hydraulic cementitious compound to cement the pieces together, using preferably ordinary neat Portland cement thoroughly mixed so as to entirely eliminate air bubbles therein. I then allow the cement to set, preferably by the usual process which consists in slowly passing the cemented parts through a heated chamber wherein in the early stages the parts are subjected to moist heat and gradually to less and less moisture until in the final stage of the process the heat is perfectly dry. At this time the cement has set and the insulator parts may be removed from the drying chamber and placed within a separate heating chamber, or means may be provided for increasing the heat in the drying chamber to a heat above the maximum now utilized. This additional heating of the connected parts dries off from the cement a large portion of its moisture content and causes the cement to expand, thereby opening the pores of the cement. This same heat causes the coating compound to become fluid or sufficiently fluid to enter the pores of the cement due to capillary attraction. The compound having entered the cement, is trapped therein by the forces of adhesion and capillary attraction, thus impregnating the surface of the body of the cement to a greater or less extent. The insulator and its connected parts are then allowed to cool and are ready for shipment.

I preferably apply to the exposed portions of the cement at a convenient time, either before the additional heating or when the cement is expanded, sufficient of the oily compound to thoroughly impregnate these surfaces to render the same impervious to moisture.

It might be well to point out that by utilizing the process above outlined, I not only prevent further hydration of the hydraulic cementitious compound, but prevent any chemical action upon metallic units which form a part of suspension insulators since the treated cement prevents moisture from coming in contact with the metal and setting up at a point of contact, chemical action between the cement and metal. By coating the porcelain surfaces with the oily compound, I also prevent moisture from entering the porcelain should the latter be of poor quality since this compound may be applied to the entire unglazed portions of the porcelain and will prevent the same absorbing moisture.

Having now described my process, what I claim and desire to secure by Letters Patent is,—

1. A method of connecting parts of an electric insulator, said method involving coating with water-proofing material the surfaces to be connected, filling the space between the surfaces thus coated with a hydraulic cement, allowing said cement to set, elevating the temperature of the cement sufficiently to cause the surfaces thereof which are in contact with said water-proofing material to absorb at least a portion of said water-proofing material, and applying water-proofing material to the exposed surface of said cement.

2. A method of connecting parts of an electric insulator, said method involving coating with water-proofing material the surfaces to be connected together, filling the space between the surfaces thus coated with a hydraulic cement, allowing the cement to set, elevating the temperature of the cement sufficiently to drive off therefrom a portion of the moisture content thereof so as to expand the said cement, maintaining the insulator parts at this temperature until the cement has absorbed at least a portion of the water-proofing material, and finally applying water-proofing material to the exposed surface of said cement prior to the elevating of the temperature of the cement.

3. A method of connecting parts of a porcelain insulator, said method involving coating with an oily compound the surfaces to be connected, filling the space between the surfaces so coated with hydraulic cement, subjecting said parts to heat until the cement has set, elevating the temperature to which said parts are subjected to cause the cement to expand and to absorb along its surfaces at least a portion of said oily compound and applying said compound to the exposed surfaces of said cement.

In testimony whereof I affix my signature.

MINOR F. H. GOUVERNEUR.